(12) United States Patent
Schimmel et al.

(10) Patent No.: US 8,017,564 B2
(45) Date of Patent: Sep. 13, 2011

(54) LUBRICATION BY EXPOSURE TO LIGHT

(75) Inventors: Thomas Schimmel, Karlsruhe (DE); Othmar Marti, Ulm (DE)

(73) Assignee: Landesstiftung Baden-Württemberg GmbH, Stuttgart (DE)

( * ) Notice: Subject to any disclaimer, the term of this patent is extended or adjusted under 35 U.S.C. 154(b) by 672 days.

(21) Appl. No.: 12/064,025

(22) PCT Filed: Aug. 18, 2006

(86) PCT No.: PCT/EP2006/008168
§ 371 (c)(1), (2), (4) Date: Aug. 20, 2008

(87) PCT Pub. No.: WO2007/020102
PCT Pub. Date: Feb. 22, 2007

(65) Prior Publication Data
US 2008/0312109 A1   Dec. 18, 2008

(30) Foreign Application Priority Data
Aug. 19, 2005   (DE) .......................... 10 2005 039 594

(51) Int. Cl.
*C10M 135/00* (2006.01)
*C10M 129/04* (2006.01)
(52) U.S. Cl. .......................... 508/100; 508/567; 508/583
(58) Field of Classification Search .................. 508/100, 508/567, 583
See application file for complete search history.

(56) References Cited

U.S. PATENT DOCUMENTS

| 5,775,510 | A | * | 7/1998 | Hodges | 206/724 |
| 6,096,694 | A | * | 8/2000 | Tei et al. | 508/562 |
| 6,107,680 | A | * | 8/2000 | Hodges | 257/680 |
| 2003/0123335 | A1 | * | 7/2003 | Rettner et al. | 369/13.24 |
| 2004/0231926 | A1 | * | 11/2004 | Sakhrani et al. | 184/18 |

FOREIGN PATENT DOCUMENTS

DE    27 12 874 A1    9/1978

OTHER PUBLICATIONS

International Search Report issued in corresponding International Application No. PCT/EP2006/008168.
Translation of IPRP (Chapter I) issued in corresponding International Application No. PCT/EP2006/008168.

\* cited by examiner

*Primary Examiner* — Jim Goloboy
(74) *Attorney, Agent, or Firm* — Knobbe Martens Olson & Bear LLP

(57) ABSTRACT

The present invention concerns a method for a location and/or time-dependent alteration of the friction coefficient and/or adhesion force between two bodies, which includes irradiation of one or both contact surfaces between the bodies with radiation, use of the method according to the invention for location and/or time-dependent alteration of the friction coefficient and/or adhesion force between to bodies, a system that includes two bodies in which the friction coefficient and/or the adhesion force between the bodies can be temporarily or permanently altered, and a device for location and/or time-dependent regulation of the friction coefficient and/or adhesion force which includes the system according to the invention and a control unit.

26 Claims, No Drawings

LUBRICATION BY EXPOSURE TO LIGHT

RELATED APPLICATIONS

This application is a U.S. National Phase of International Application No. PCT/EP2006/008168, filed 18 Aug. 2006, designating the U.S. and published not in English as WO 2007/020102 22 Feb. 2007, which claims the benefit of German Application No. 10 2005 039 594.5, filed 19 Aug. 2005.

The present invention concerns a method for location and/or time-dependent alteration of the friction coefficient and/or adhesion force between two bodies, which includes exposure of one or both contact surfaces between the bodies to radiation, use of the method according to the invention for location and/or time-dependent alteration of the friction coefficient and/or adhesion force between two bodies, a system that includes two bodies in which the friction coefficient and/or adhesive force between the two bodies can be temporarily or permanently changed, and a device for location and/or time-dependent control of the friction and/or adhesion force, which includes the system according to the invention and a control unit.

Any movement, at least on the earth, is connected with conversion of kinetic energy to heat energy. Friction forces are responsible for this energy loss. Friction forces, in addition to energy loss, generally also cause wear of the components in contact. It is estimated that about 5% of the gross national product in industrial nations is lost by wear related to friction. Optimization of the properties of friction surfaces and lubricating films between friction surfaces to minimize friction therefore acquires considerable economic significance.

In contrast to this, friction is desired in other areas of engineering. This applies, for example, in processes in which energy is to be deliberately dissipated, for example, in vehicle brakes or in systems to be dampened in controlled fashion.

Friction of a defined magnitude is also deliberately used in friction clutches and Ferguson couplings. A defined torque is produced in a cassette recorder by friction independently of the speed of the motor and cassette, which is defined by the dynamic friction forces between rotating disk-like objects.

Friction and adhesion is also of central significance in microengineering, since objects can be made deliberately movable or fixed by changing friction and adhesion. It is then important to state that there is a direct relation between friction properties and adhesion properties and the change of one of the two properties generally also causes a corresponding change of the other property.

A precisely defined and reproducible adjustment of friction and adhesion is therefore essential for many technical components (surfaces, bearings, clutches, etc.). This ordinarily occurs by changing appropriate surface coatings and functionalizations and/or by the use of lubricants.

However, it is not possible to deliberately and continuously adjust in this way the friction coefficient between two bodies between a maximum value and a minimum value (this is also referred to here as tailor-made friction or tailor-made lubrication), and/or to vary it as a function of time. In addition, it is not possible with ordinary methods to reversibly or irreversibly change or control the friction coefficient as a function of location.

The underlying task of the present invention is therefore to provide new systems and methods that are supposed to make it possible to reversibly, partially reversibly or irreversibly, deliberately and continuously adjust the friction coefficient and/or adhesion force between two bodies between a maximum value and a minimum value and change or control it on demand as a function of time or location.

This task is solved by the embodiments characterized in the claims.

The present invention in particular provides a method characterized by the fact that the friction coefficient and/or adhesion force between two bodies is varied as a function of location and/or time, by exposure to radiation of an appropriate wavelength and in this way temporarily or permanently altering the properties of one or both contact surfaces between the two bodies or the lubricant between the two bodies. The method according to the invention is preferably characterized by that molecules or at least one coating is or are applied to one or both contact surfaces, in which exposure to radiation of an appropriate wavelength causes photochemical reactions that again cause a change in friction coefficient between two bodies.

The present invention therefore concerns a method for location and/or time-dependent alteration or adjustment of the friction coefficient and/or adhesion force between two bodies, which includes exposure of one or both contact surfaces between bodies to radiation, at least one of the two contact surfaces between the bodies having a component that temporarily or permanently changes the friction coefficient and/or the adhesion force induced by radiation between the two bodies.

In the context of the present invention the term "friction" is essentially understood to mean static friction and dynamic friction. The friction force FR is approximately independent of velocity and is only determined by the normal force FN through which the body is forced onto the support:

$$F_R = \mu \cdot F_N.$$

The proportionality constant $\mu$ is then referred to as friction coefficient. The friction coefficient depends on the type and surface condition of the two materials and for static friction is generally greater than for dynamic friction. In the context of the present invention the friction coefficient is used as a gauge of the strength of the friction occurring between two bodies.

The term "adhesion force" in the context of the present invention is understood to mean the force that occurs between two solids and/or a solid and liquid and causes adhesion of the two substances to each other. This force is also referred to as surface adhesion or simply adhesion.

The radiation-induced change in friction coefficient and/or adhesion force between two bodies is also referred to as "photolubrication" in the context of the present invention. This change can represent either an increase or reduction in friction coefficient and/or adhesion force. The change in friction coefficient preferably concerns a change in static friction coefficient and/or dynamic friction coefficient.

According to the present invention the two bodies are arbitrary bodies optionally different from one another, which are in contact with each other or can be brought into contact with each other and between which friction and/or adhesion occurs on the contact surfaces during contact. The material of the contact surfaces can be any appropriate material. The contact surfaces of the two bodies independently of each other preferably consist of metals or metal alloys, glass or other oxide materials, plastics, silicon, ceramic materials or composites, preferably based on carbon, graphitic materials, molybdenum disulfide or other layered materials or layered silicates.

At least one of the two contact surfaces preferably consists of functionalized or nonfunctionalized silicon. In this material, which is of particular significance for microsystem engineering and for microelectromechanical systems (MEMS), both the tribological and adhesive properties strongly depend on the functionalization of the surface. The uppermost layer of a silicon wafer, a silicon surface or a silicon gear can consist, for example, of a native silicon oxide layer formed in air or be deliberately functionalized with hydrogen or deliberately terminated with hydroxyl groups. The surface chemistry can be purposefully adjusted by irradiation in an inert or reactive environment.

The two bodies, for example, can be two disks of a vehicle brake or a friction clutch or Ferguson coupling. One of the two bodies can also be a vibrating board and the other object an object being sorted, for example, in the form of a spectrally selective vibrating board during exposure to radiation of different wavelength.

Irradiation of one or both contact surfaces between the bodies can occur by any radiation that is appropriate for temporarily or permanently altering the friction coefficient and/or adhesion force between the two bodies. For this purpose particle radiation, like electron radiation, or electromagnetic radiation can be used. The radiation is preferably chosen from the group consisting of visible light, UV light, infrared radiation, microwave radiation, gamma radiation, electron radiation, neutron radiation, synchrotron radiation and x-rays. Use of electromagnetic radiation in a wavelength range from 150 to 550 nm is particularly preferred.

Irradiation can occur in any manner appropriate for the radiation to reach one or both contact surface of both bodies. This can occur, for example, by a pulsed or continuous laser or an ordinary light source, like a lamp, UV lamp, gas discharge lamp or halogen lamp. In a preferred embodiment of the present invention irradiation occurs by means of an appropriate optical wave guide through which the corresponding radiation is supplied to one or both contact surfaces between the bodies. In another preferred embodiment of the present invention at least one of the two bodies is at least partially transparent to the corresponding radiation so that irradiation of the contact surfaces can occur through the radiation-transparent body.

For example, the surface functionalizations or chemical composition of the contact surfaces can be deliberately altered via a continuous or pulsed laser or other types of radiation thermally, photochemically or in another radiation-induced fashion in an inert gaseous or liquid environment (for example, helium, argon or other protective gases, inert liquids, vacuum) or in a reactive gaseous or liquid environment (for example, air, oxygen, hydrogen, ammonia, HCl, acids, alkalis). Reactive and inert solutions and gas mixtures are also suitable. Depending on the exposure time and intensity, the intensity of the change in tribological and adhesive properties can be continuously altered and adjusted to a desired value.

At least one of the two contact surfaces between the bodies has a component that temporarily or permanently changes the friction coefficient and/or the adhesion force induced by radiation between the two bodies.

In a preferred embodiment of the present invention the component is contained in the material from which at least one contact surface is constructed or represents the material from which the contact surface is constructed. The component can then be a chemical compound, which is a component of the material of the contact surface, or represent a functional group or atoms, for example, silicon, of a component in the material or the material itself from which at least one contact surface is constructed.

In another preferred embodiment the at least one component that can temporarily or permanently change the friction coefficient and/or adhesion force induced by radiation between the two bodies is applied in the coating on at least one of the two contact surfaces between the bodies. The coating can be applied in any appropriate form to at least one of the two contact surfaces. In a preferred embodiment the coating is firmly bonded to at least one contact surface, for example, by a chemical bond and/or as a firmly adhering film. The coating is preferably applied in the form of self-assembled monolayer of molecules (SAM), for example, thiols on metal surfaces, like gold or silver, or silanes on silicon dioxide or other oxide surfaces, or in the form of a Langmuir-Blodgett layer or multilayer on at least one of the two contact surfaces. When the coating is present in the form of a monolayer, this monolayer of molecules can be applied in ordered fashion (for example, in the case of SAM) or also disordered.

In another preferred embodiment the coating is a lubricant arranged between the contact surfaces of the two bodies. This lubricant can be a lubricating oil, lubricating grease or solid lubricant. Appropriate lubricants are known in the prior art.

The coating can have any appropriate thickness. The thickness of the coating preferably lies in the range from 0.1 nm to 10 µm, especially in the range from 0.15 nm to 50 nm.

The component can also be freely adsorbed on the contact surface, bonded to at least one contact surface via van der Waals interactions, polar interactions and/or hydrogen bonds, be chemisorbed on at least one contact surface or chemically bonded (covalently or ionically) to at least one contact surface.

It is also possible to combine different forms in which the contact surfaces can have the at least one component. Both the contact surface itself can have the at least one component and at the same time a coating can be present in the form of a lubricant that contains the same or a different component between the contact surfaces. It is also possible that one or both contact surfaces have the at least one component in the form of a coating firmly bonded to at least one contact surface and at the same time a coating in the form of a lubricant that contains the same or another component is present between the contact surfaces.

Preferably the at least one component that temporarily or permanently alters the friction coefficient and/or adhesion force between the two bodies induced by radiation is a compound chosen from the group consisting of thiols, silanes and polymers (for example, in the form of polymer brushes).

The change in friction coefficient and/or adhesion force preferably occurs in that the at least one component enters into a chemical reaction, a conformation change or a structural change through the radiation, which can be reversible, partially reversible or irreversible. In the context of the present invention the chemical reaction is understood to mean any reaction in which at least a chemical bond (for example, a covalent, ionic or hydrogen bond) is broken and/or linked. The current conformation change is understood to mean any change in the conformation of a molecule in which no chemical bond is broken and/or linked. A structural change is understood to mean a change in physical properties of a number of molecules, for example, in a polymer. A structural change can then also be the result of a chemical reaction and/or conformation change. In another preferred embodiment a change in surface roughness of the least one contact surface occurs by irradiation, which causes the change in friction coefficient and/or adhesion force.

The chemical reaction, the conformation change or the structural change preferably occurs photochemically or thermally. A thermal reaction can be induced, for example, by appropriate laser radiation. In order to achieve a chemical reaction the at least one component preferably has one or more functional groups that are appropriate for entering into a chemical reaction induced by radiation. Appropriate chemical reactions include isomerizations, cleavage of azo or peroxide groups, radical reactions and pericyclic reactions, like Diels-Alder cycloaddition and reversion.

Appropriate functional groups that influence the friction and adhesion properties include amino groups, hydroxyl groups, ester groups, carboxyl groups, groups that dissociate and do not dissociate in (for example, aqueous) solution, polar and nonpolar, hydrophilic and hydrophobic groups.

Polymers, like polystyrene, polymethylmethacryate (PMMA), polycarbonate, polyacetylene, polydiacetylene, polyolefins, polyethylene, polyisopropylene and polypropylene, aramids and polyaramids (for example, Kevlar) and biopolymers, like polysaccharides, cellulose and its derivatives, are also suitable for the method according to the invention. A single radiation-induced modification of the surface and therefore the friction and/or adhesion properties then preferably occurs by radiation-induced degradation (for example, photodegradation, for example, by UV radiation) or by radiation-induced functionalization, in which aromatic structures, structures with conjugated a-electron systems and unsaturated bonds, like double and triple bonds, are activated or broken by radiation.

Radiation-induced denaturation of biomolecules and biopolymers can also be used. The configuration, conformation and especially tertiary structure of functional units and groups, molecules, polymers, biomolecules, biopolymers and supramolecular structures that construct such structures with participation of hydrogen bonds can also be easily and sometimes reversibly altered by radiation. Hydrogen bonds can be reversibly broken by irradiation or functional groups removed or altered in radiation-induced fashion, which are essential for formation of the group of hydrogen bonds. It is then advantageous that small changes in the system or network of hydrogen bonds can have significant effects on the relative steric arrangement of the groups through the molecule, the conformation and tertiary structure and therefore can cause significant changes in friction and adhesion properties of the contact surface(s).

In another preferred embodiment photodegradation of aromatic esters and biphenyl benzoate, as well as radiation-induced conversion of esters to alcohols is used to alter the friction coefficient and/or adhesion force between two bodies.

The at least one component that temporarily or permanently changes the friction coefficient and/or adhesion force between the two bodies in radiation-induced fashion can also be the molecule z-DOL or one of its derivatives, used as a lubricant on hard disk surfaces.

Compounds in which irradiation-induced change in ratio of cis- to trans-isomer causes a change in friction and/or adhesion properties are also suitable as component. Among others, β-carotene and retinol are suitable for reversible radiation-induced cis/trans-isomerization, in which irradiation-induced switching between the cis- and trans-configuration is possible.

In another preferred embodiment the component used in the method according to the invention is an azopeptide, which enters into photo-induced conformation changes. An advantage of using azopeptides lies in their rapid relaxation. These processes are thus largely concluded already on the picosecond time scale, which permits extremely rapid switching of the friction and adhesion properties.

In another preferred embodiment the component used in the method according to the invention is azobenzene, which can be used among other things as a photoswitch, in which isomerization typically occurs after excitation by electromagnetic radiation in a period from 150 to 350 femtoseconds.

In another preferred embodiment the component used in the method according to the invention is a stilbene and/or an anthracene, in which preferably layers of stilbene and/or anthracenes are used. The effect of radiation-induced reversible or irreversible orientation is then exploited. The effect of radiation-induced orientation, for example, permits generation and control of direction-dependent friction. Depending on the direction of polarization, the direction of minimal friction can be reversibly or irreversibly set and varied as a function of location and/or time in controlled fashion. Orientation then preferably occurs in the direction of the unreacted units perpendicular to the vector of the electric field of the employed radiation. The method according to the invention therefore can be used not only for location and/or time-dependent variation of the friction coefficient and/or adhesion force but also for direction-dependent alteration or for direction-dependent alteration alone.

The component also includes a polar hydroxyalkyl, thioalkyl or carboxyalkyl group which can be cleaved by radiation. By cleavage of such a polar group it is possible, for example, to alter the tribological and adhesive properties of at least one contact surface so that the friction coefficient and/or adhesion force between the bodies is significantly changed.

In another preferred embodiment of the present invention the component is chemically bonded to at least one contact surface. This bonding to the contact surface can occur, for example, via a sulfide function or siloxane function contained in the component.

In a particularly preferred embodiment of the present invention the component is a thiol bonded to the contact surface with the group —$(CH_2)_n$—O—O—$(CH_2)_m$—SH, in which n and m independently of each other are a whole number from 1 to 20 and the peroxide bond can be cleaved by radiation.

In another preferred embodiment of the present invention at least one of the two contact surfaces has the at least one component in the form of a pattern that can be changed as a function of location and/or time. By appropriate choice of the component the friction coefficient and/or the adhesion force between the two bodies can be varied in time-dependent fashion. During use of a component that enters into an irreversible reaction induced by radiation, for example, cleavage of a polar group, a permanent change in friction coefficient and/or adhesion force occurs, which also persists after termination of irradiation. If, on the other hand, a component is used that enters into a reversible reaction induced by radiation, for example, isomerization, the change can be temporary in nature. Conversion into the original state then optionally is radiation-induced or occurs without an external effect after relaxation, preferably after short relaxation.

It is possible, for example, with the method according to the invention to temporarily or permanently modify the friction coefficient and/or adhesion force between two bodies by proportioning of the radiation and to precisely adjust it via the extent of modification (i.e., the percentage of component contained in the coating which entered into the chemical reaction, a conformation change or a structural change induced by light). The adhesion force and/or the friction coefficient can be adjusted in tailor-made fraction with the method according to the invention (such a friction coefficient is also referred to as "tailor-made friction coefficient"). It is also possible to modify the friction coefficient and/or adhesion force between two bodies deliberately by exposure to appropriate radiation in time-dependent fashion (this is also referred to here as "lubrication on demand").

The friction coefficient and/or the adhesion force between the two bodies can also be varied as a function of location by exposing only a partial area of the at least one contact surface having the component or exposing only a partial area of the at least one contact surface.

In another preferred embodiment exposure of one or both contact surfaces between the bodies occurs in the form of a location-dependent and/or time-dependent pattern. This can occur through methods known in the prior art by using masks, like contact masks or optical imaging systems, or point-for-point, for example, in a grid pattern. In addition, by appropriate location and/or time-dependent modulation of the intensity of the radiation, a pattern can be generated through which the extent, duration and location of the change of the friction coefficient and/or adhesion force can be precisely and continuously adjusted between a minimal and maximal value. This is possible, for example, by pulsed irradiation systems.

In another preferred embodiment of the method according to the invention at least one of the two contact surfaces has at least two different components that change the friction coefficient and/or adhesion force between the two bodies independently of each other during different radiation. For example, a partial area of the contact surface can contain one component and another partial area of the contact surface another component. This is possible, for example, by structured coating by means of microcontact printing. Depending on the radiation employed, the one or other component can then vary its friction or adhesion properties. During use of both wavelengths both components can simultaneously vary their friction and/or adhesion properties.

However, it is possible that the two components are not spatially separated from each other in the at least contact surface but are present next to each other. In this way it is possible to adjust both the friction and adhesion properties of contact surfaces between the two bodies. In order to adjust the different properties essentially independently of each other at least two parameters adjustable independently of each other are necessary. By using two different components that change the friction coefficient and/or adhesion force between the two bodies during different radiation, two such parameters are present. Because of this the friction coefficient and the adhesion force of the contact surfaces between the two bodies can be changed or adjusted in tailor-made fashion as a function of location and time.

An important advantage of using radiation in the method according to the invention therefore lies in the spectral degree of freedom. During use of different components in the coating that vary their friction properties and/or adhesion properties by exposure to different radiation or wavelength the friction coefficient and/or adhesion force of the contact surfaces between the two bodies can be adjusted independently of each other on this account. This preferably occurs by location and/or time-dependent modulation of the intensity of the radiation.

Another advantage of using radiation in the method according to the invention lies in the fact that radiation, especially light can be introduced cost-effectively and location-selectively onto a surface with resolution into the nanometer range. Use of electromagnetic radiation also permits simple modulation as a function of time and exact and cost-effective spatial and time-controlled light intensity. Numerous radiation-induced chemical reactions, conformation changes and structural changes also run extremely quickly, which causes direct and rapid change of the friction coefficient and/or adhesion force of the contact surface(s) from irradiation.

In contrast to this, non-radiation-induced chemical reactions in comparison with radiation-induced reactions often are much slower and would therefore not permit direct and rapid change of the friction coefficient and/or adhesion force of the contact surface(s). In non-radiation-induced chemical reactions, for example, ordinary heat-induced reactions, a much more limited spatial resolution is also possible. Electrically-induced surface processes for changing friction properties and/or adhesion properties, in contrast to the radiation-induced method according to the invention would require the use of electrodes, which would be very disadvantageous in numerous applications.

The present invention also concerns the use of the method according to the invention for location and/or time-dependent alteration of the friction coefficient and/or adhesion force between two bodies. This change can occur reversibly, partially reversibly or irreversibly.

This method can be used, for example, for self-assembly of objects on a surface with structured friction and therefore in the form of a vibrating board. This can be achieved in that objects on the surface on the areas with low friction coefficient and/or low adhesion force are placed in motion by mechanical excitation, for example periodic excitation and only adhere in the areas with high friction coefficient and/or adhesion force (also referred to below as contact pads). The contact pads represent a template as a high-friction contact surface. Preferably the contact pads have roughly the same size and shape as the contact surfaces of the objects being assembled. The objects can then be brought not only into the correct position but also into the correct spatial orientation, which is stipulated by the alignment of the contact pads. In this way different objects can be arranged on the surface with structured friction, in which the objects differ significantly from each other in their contact surface and each object is fixed on the contact pad which best corresponds to the shape of the contact surface of the object.

Two or more different types of objects can preferably also be separated by the vibrating board in which each contact pad has two or more different components that change the friction coefficient and/or adhesion force between the contact pad and the object being assembled during different radiation independently of each other. In this way it is possible by exposure to light of one wavelength to selectively activate one component of the contact pad so that only the type of objects matching this component adhere to the contact pads, whereas by exposure to light with another wavelength another component is activated and the corresponding objects adhere to the contact pads. By exposure to both wavelengths a situation can also be achieved in which both types of objects simultaneously adhere to the contact pads.

However, it is also possible that two or more different types of contact pads are present, each of which have components different from each other. In this way it is possible by exposure to light of one wavelength to activate one type of contact pad so that only the type of objects matching these contact pads adhere to them, whereas by exposure to light with another wavelength another type of contact pad is activated and the corresponding objects adhere to these contact pads. By exposure to both wavelengths a situation can also be achieved in which both types of objects will simultaneously adhere to the contact pads.

In another preferred embodiment the method according to the invention is used for sorting of objects, in which only those objects remain on the contact pads whose contact surface corresponds essentially to the shape of the contact pads, whereas the other objects do not adhere because of mechanical excitation. Further transport and sorting of the objects that do not match the contact pads then preferably occurs in that the surface with structured friction is sloped relative to the horizontal and during mechanical excitation further transport of the objects that do not adhere to a contact pad with sufficient contact surface occurs. Preferably the amplitude of the mechanical excitation is chosen sufficiently high so that the objects whose contact surface does not match the contact pads in shape and size do not adhere but are further transported. At the same time, the amplitude should also be chosen sufficiently low so that the objects matching the contact pads continue to adhere to them despite the existing mechanical excitation and at most are adjusted in their orientation to the contact pad.

Mechanical excitation preferably occurs by a vibrating method, by ultrasound, shock waves or surface waves. Mechanical excitation can also occur by a stick-slip process in which the template is preferably moved periodically slowly in one direction and then quickly in the opposite direction so that by inertial forces during fast partial movement a sliding movement of the objects on the low-friction areas of the surface (but not on the contact pads) occurs, but during slow movement it does not occur. In another preferred embodiment the objects being sorted differ in their friction coefficients.

The method according to the invention can also be used in order to fix objects on a surface by a corresponding increase in static friction by irradiation or to loosen objects from a surface fixed on it by static friction before irradiation by irradiation and the reduction in static friction caused by it. It is also possible to brake or initiate or accelerate a movement in deliberate and controlled fashion at a desired time and at a desired location by changing the friction coefficient as a function of location and time.

In another preferred embodiment the method according to the invention can be used in order to compensate for the change in friction properties and/or adhesion properties of a friction surface that are produced by a texture change in a friction system by corresponding opposite changes in friction properties and/or adhesion properties by irradiation. In this way the friction coefficient and/or adhesion force in a friction system can be kept constant independently of the operating temperature.

The method according to the invention is used with particular preference in micromechanical systems, in micro and nanosystem engineering and/or in micro- and nanoelectromechanical systems (MEMS and NEMS).

The present invention also concerns a system that includes two bodies that are in contact with each other or can be brought into contact with each other, at least one of the two contact surfaces between bodies having a component as defined above, which temporarily or permanently changes the friction coefficient and/or adhesion force between the two bodies induced by radiation.

The present invention also concerns a device for location and/or time-dependent control of the friction coefficient and/or adhesive force, including the system according to the invention and control unit. The control unit preferably includes means to determine the friction coefficient and/or the adhesion force and means operationally connected to it to control the friction coefficient and/or adhesion force.

With the device according to the invention the friction and/or adhesion can be deliberately adjusted also by means of the device for regulating the friction coefficient and/or adhesion force. The means for regulating the friction coefficient and/or adhesion force is preferably an electronically controlled control loop, preferably with a computer.

The friction and/or adhesion can therefore be adjusted in the context of a manufacturing or production process via irreversible radiation-induced changes continuously to a desired value precisely according to specifications or adjusted in customer-specific fashion for each individual manufactured product. However, there is also the possibility of continuously monitoring the friction in a running system (for example, micromotor, clutch, MEMS, bearing, gear mechanism, etc.) and deliberately correcting and/or adjusting it to a desired value and maintaining this desired value or reference value by means of a control circuit by means of irreversible or preferably reversible radiation-induced processes. This is particularly advantageous, since the friction or the reference value of the friction coefficient and/or the adhesion force that are stipulated to the control circuit is location and/or time-dependent and can therefore be adjusted to different values within the same system at different locations (for example, micromotor, clutch, MEMS, bearing, gear mechanism, etc.) by adjusting the radiation intensity and/or duration or radiation dose in location-dependent fashion per unit surface.

The means for determining the friction coefficient and/or the adhesion force preferably includes a measurement sensor or measurement system through which even the friction coefficient and/or the adhesion force is measured directly or a quantity correlated with these quantities. However, the chemical condition of at least one contact surface and/or the coating or properties that are dependent on this condition can also be measured by the means for determining the friction coefficient and/or the adhesion force. These properties could be spectroscopic properties, for example, which can be measured preferably with an optical, infrared, visible (VIS) and/or ultraviolet spectrometer in which irradiation and spectroscopy measurement can occur locally by means of optical wave guides at the desired location. As an alternative the beam of the irradiation source and/or the detection point of the spectroscopic detector can be scanned in a scanning method over the surface or guided point for point to the sites relevant for friction and/or adhesion.

The device according to the invention includes as means for controlling the friction coefficient and/or adhesion force preferably a computer, an electronic circuit, a control circuit or other control device, which process the measure data or other information concerning the state of the at least one contact surface and/or optionally the coating and determines from them whether and with what intensity, duration and dose irradiation must be further carried out in order to achieve the desired friction and/or adhesion value or how the irradiation power or intensity must be altered in order to eliminate the measured deviation from the reference value.

The condition of the contract surface is preferably controlled by means of a measurement device in the process and driven, controlled or regulated with a computer that processes the measured data and the irradiation time and/or dose. This preferably occurs by means of a PID control circuit. Because of this a computer-controllable irradiation source is operated so that the irradiation time and/or irradiation intensity and/or doses are controlled by the computer. In irreversible processes irradiation is ended as soon as the desired friction and/or adhesion values are reached. In reversible processes the average intensity of the radiation is adjusted so that the desired values are maintained, or if operation of the mechanical system, MEMS or electromechanical system requires it, are adjusted at any time to new or altered reference values of friction and/or adhesion.

Because of this it is possible to adjust the friction and adhesion properties independently of each other in which two different components (molecules, functional groups or two different layers, coating or surface conditions) are present on the contact surfaces, which are sensitive to different types of radiation or to different wavelengths of the same type of radiation and change their friction and adhesion properties through it. If one species during exposure to irradiation wavelength of one type changes only the friction but not the adhesion properties and the other species during exposure to irradiation wavelength of another type only changes the adhesion properties but not the friction properties and if each component can only be modified by one of the two types or wavelengths and their properties, independent and continuous location and time-dependent adjustment of friction and adhesion is guaranteed. This is only possible, if both components are influenced in different ways by the two types of radiation and if each of the two types of radiation influences the friction and adhesion of each of the two species in different ways. Instead of two components, only one component with two different functional groups or chemical bonds or hydrogen bonds can also be used, which can only be change by one of the two types of radiation or wavelengths, i.e., one by one type of radiation or wavelength, the other by the other or both by both but with different yield or sensitivity. Two independent parameters are therefore obtained in order to influence friction and adhesion and it is possible within a finite value range, which depends on the two components, to adjust the two parameters friction or adhesion independently of each other and adjust them to a desired reference value.

The present invention will be further explained below by means of examples without being restricted by them.

EXAMPLES

Example 1

A gold-coated surface is dipped for several hours for coating into a solution that contains an alkanethiol. The alkanethiol carries a thiol group on one end of the alkyl group and a polar hydroxyl group on the other end. An azo group cleavable by UV light is also situated in the alkane chain. The alkanethiol is bonded via the thiol function to the gold surface and a self-assembled monolayer (SAM) of this component is formed with polar groups pointing away from the gold surface.

The planar surface so coated is brought into contact with a quartz glass surface also functionalized with polar groups and the friction coefficient between the two bodies determined.

The contact surface of the two bodies is then irradiated through the quartz glass with UV light so that the azo group of the alkanethiol component is cleaved in the coating. The group with the polar hydroxyl group is eliminated in this way, interaction with the polar glass surface become more limited and the friction coefficient between the two components is therefore reduced.

Depending on the dose of irradiation with UV light, only part of the azo groups contained in the coating are cleaved so that the friction coefficient and the adhesion force between the two contact surfaces can be continuously adjusted between the value for the original coating and the value for the completely cleaved polar groups of the alkanethiol component in the coating.

Example 2

A mechanical clutch that includes two circular disks is provided on the contact surface of one of the two circular disks with a coating containing a component that temporarily changes the friction coefficient between the two disks induced by radiation. The other disk is transparent to the corresponding radiation. Both disks are brought into contact with each other, during which one of the two disks is driven by a motor and rotated around a shaft. The other disk is connected via a transmission to the wheels of the vehicle. As long as the clutch interface is not irradiated, the second disk is at rest, since the torque transferred by dynamic friction is too limited to place the vehicle in motion. However, as soon as the friction surface is appropriately irradiated through the transparent disk, a reversible chemical reaction or conformation change of the at least one component contained in the coating occurs so that the friction between the two disks is increased and the clutch engages. As a result the vehicle moves. If the radiation is stopped, the vehicle stops again.

In this way a photomodulated mechanical drive and clutch can be implemented. Mechanical engagement and displacement or operation of the clutch pedal can drop out. This method permits much more precise and rapid regulation in comparison with ordinary mechanical devices.

The invention claimed is:

1. A method for location and/or time-dependent alteration of the friction coefficient and/or adhesion force between two bodies which comprises irradiating -one or more contact surfaces between the bodies with radiation, at least one of the two contact surfaces having at least one component that temporarily or permanently changes the friction coefficient and/or adhesion force between the two bodies induced by radiation, wherein the at least one component that temporarily or permanently changes the friction coefficient and/or the adhesion force between the two bodies induced by radiation contains a polar hydroxyalkyl, thioalkyl or carboxyalkyl group that can be cleaved by radiation.

2. The method according to claim 1, wherein the radiation is selected from the group consisting of visible light, UV light, infrared radiation, microwave radiation, gamma radiation, electron radiation, neutron radiation, synchrotron radiation and x-rays.

3. The method according to claim 1, wherein irradiation occurs by waveguide effects.

4. The method according to claim 1, wherein at least one of the two bodies is transparent for the radiation.

5. The method according to claim 1, wherein the at least one component that temporarily or permanently changes the friction coefficient and/or adhesion force between the two bodies induced by radiation is applied in a coating on at least one of the two contact surface between the bodies.

6. The method according to claim 5, wherein the coating is firmly bonded to at least one contact surface.

7. The method according to claim 5, wherein the coating is a lubricant arranged between the contact surfaces of the two bodies.

8. The method according to claim 5, wherein the coating has a thickness in the range from 0.1 nm to 1 μm.

9. The method according to claim 1, wherein the at least one component enters a chemical reaction, a conformation change or a structural change induced by radiation, which causes a temporary or permanent change in friction coefficient and/or adhesion force between the two bodies.

10. The method according to claim 9, wherein the chemical reaction, the conformation change or structural change is reversible.

11. The method according to claim 1, wherein the at least one component is a thiol with an $SH-(CH_2)_n-O-O-(CH_2)_m$ group, wherein n and m each are a whole number from 1 to 20 independently of each other and the peroxide bond can be cleaved by radiation.

12. The method according to claim 1, wherein at least one of the two contact surfaces has the at least one component in the form of a pattern that is varied as a function of location and/or time.

13. The method according to claim 1, wherein irradiation of one or both contact surfaces between the bodies occurs in the form of a location-dependent and/or time-dependent pattern.

14. The method according to claim 1, wherein at least one of the two contact surfaces has at least two different components that vary the friction coefficient and/or adhesion force between the two bodies independently of each other during different radiation.

15. A system comprising two bodies that are in contact with each other or can be brought into contact, wherein at least one of the two contact surfaces between the bodies has a component that temporarily or permanently changes the friction coefficient and/or adhesion force between the two bodies induced by radiation, wherein the at least one component that temporarily or permanently changes the friction coefficient and/or the adhesion force between the two bodies induced by radiation contains a polar hydroxyalkyl, thioalkyl or carboxyalkyl group that can be cleaved by radiation.

16. The system according to claim 15, wherein at least one of the two bodies is transparent for the radiation.

17. The system according to claim 15, wherein the at least one component that temporarily or permanently changes the friction coefficient and/or the adhesion coefficient between the two bodies induced by radiation is applied to the coating to at least one of the two contact surfaces between bodies.

18. The system according to claim 17, wherein the coating is firmly bonded to at least one of the contact surfaces.

19. The system according to claim 17, wherein the coating is a lubricant arranged between the contact surfaces of the two bodies.

20. The system according to claim 17, wherein the coating has a thickness in the range from 0.1 nm to 1 μm.

21. The system according to claim 15, wherein the at least one component enters into a chemical reaction, a conformation change or a structural change induced by radiation, which causes the temporary and/or permanent change in friction coefficient and/or adhesion force between the two bodies.

22. The system according to claim 15, wherein the at least one component is a thiol with an $SH-(CH_2)_n-O-O-(CH_2)_m$ group, wherein n and m each independently of each other are a whole number from 1 to 20 and the peroxide bond can be cleaved by radiation.

23. The system according to claim 15, wherein at least one of the two contact surfaces has the at least one component in the form of a pattern that can be changed as a function of location and/or time.

24. The system according to claim 15, wherein at least one of the two contact surfaces has at least two different components that independently of each other vary the friction coefficient and/or the adhesion force between the two bodies during different radiation.

25. Device for location- and time-dependent regulation of the friction coefficient and/or adhesion force, comprising the system according to claim 15 and a control unit.

26. The device according to claim 25, wherein the control unit includes means for determination of the friction coefficient and/or the adhesion force and means operationally connected to it for regulation of the friction coefficient and/or adhesion force.

* * * * *